US008896556B2

(12) United States Patent
Frazier et al.

(10) Patent No.: US 8,896,556 B2
(45) Date of Patent: Nov. 25, 2014

(54) TIME-BASED TOUCH INTERFACE

(75) Inventors: Kristopher T. Frazier, Frisco, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 13/562,584

(22) Filed: Jul. 31, 2012

(65) Prior Publication Data

US 2014/0035826 A1   Feb. 6, 2014

(51) Int. Cl.
*G06F 3/041* (2006.01)

(52) U.S. Cl.
USPC .......................................... 345/173; 715/829

(58) Field of Classification Search
CPC .................... G06F 3/0482; G06F 3/00; G06F 3/041–3/048; G06F 3/04842; G06F 3/04886; H04N 5/44543; H04N 21/4722; H04N 21/4725; H04N 21/47; H04N 21/473; H04N 21/47202; H04N 21/47205; H04N 21/47208; H04N 21/47211; H04N 5/445

USPC ............ 345/173–178, 156; 178/18.01–18.09, 178/18.11; 715/810–845
See application file for complete search history.

(56) References Cited

U.S. PATENT DOCUMENTS

| | | | | |
|---|---|---|---|---|
| 8,187,099 | B2* | 5/2012 | Taho et al. | 463/42 |
| 2004/0095395 | A1* | 5/2004 | Kurtenbach | 345/810 |
| 2009/0178008 | A1* | 7/2009 | Herz et al. | 715/840 |
| 2010/0306650 | A1* | 12/2010 | Oh et al. | 715/702 |
| 2012/0151530 | A1* | 6/2012 | Krieger et al. | 725/51 |
| 2014/0026099 | A1* | 1/2014 | Reimer et al. | 715/825 |

\* cited by examiner

*Primary Examiner* — Stephen Sherman

(57) ABSTRACT

A user device with a touch-sensitive display presents a user interface with multiple content options and detects, on the touch-sensitive display, a touch indicating selection of one of the multiple content options. The user device monitors a duration of the touch. The user device presents a first set of selectable options, associated with the one of the multiple content options, in response to determining that the duration of the touch exceeds the first time threshold, and presents a second set of selectable options, associated with the one of the multiple content options, in response to determining that the duration of the touch exceeds the second time threshold.

20 Claims, 13 Drawing Sheets

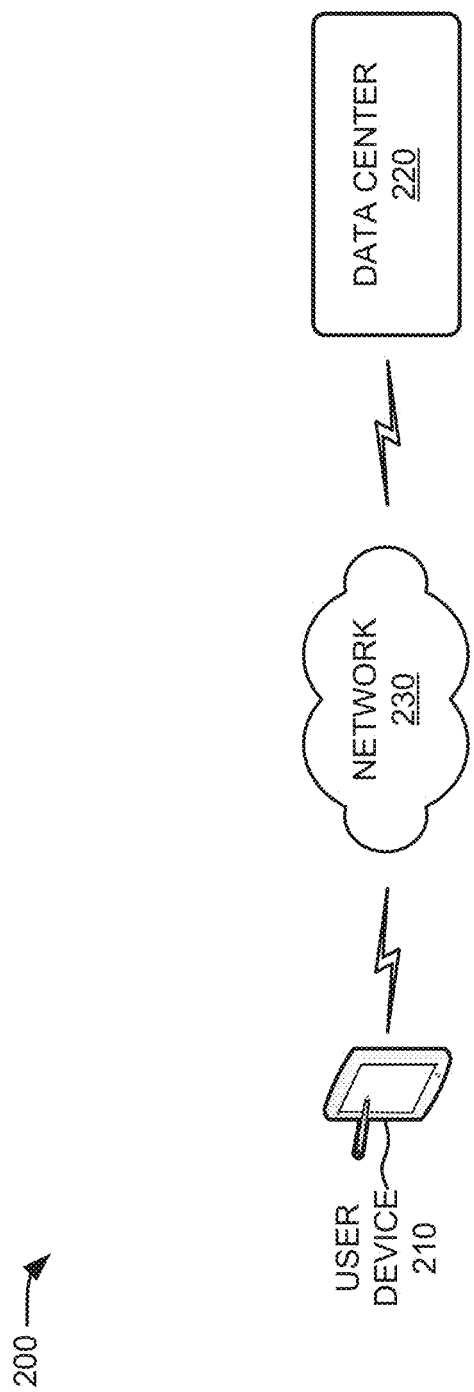

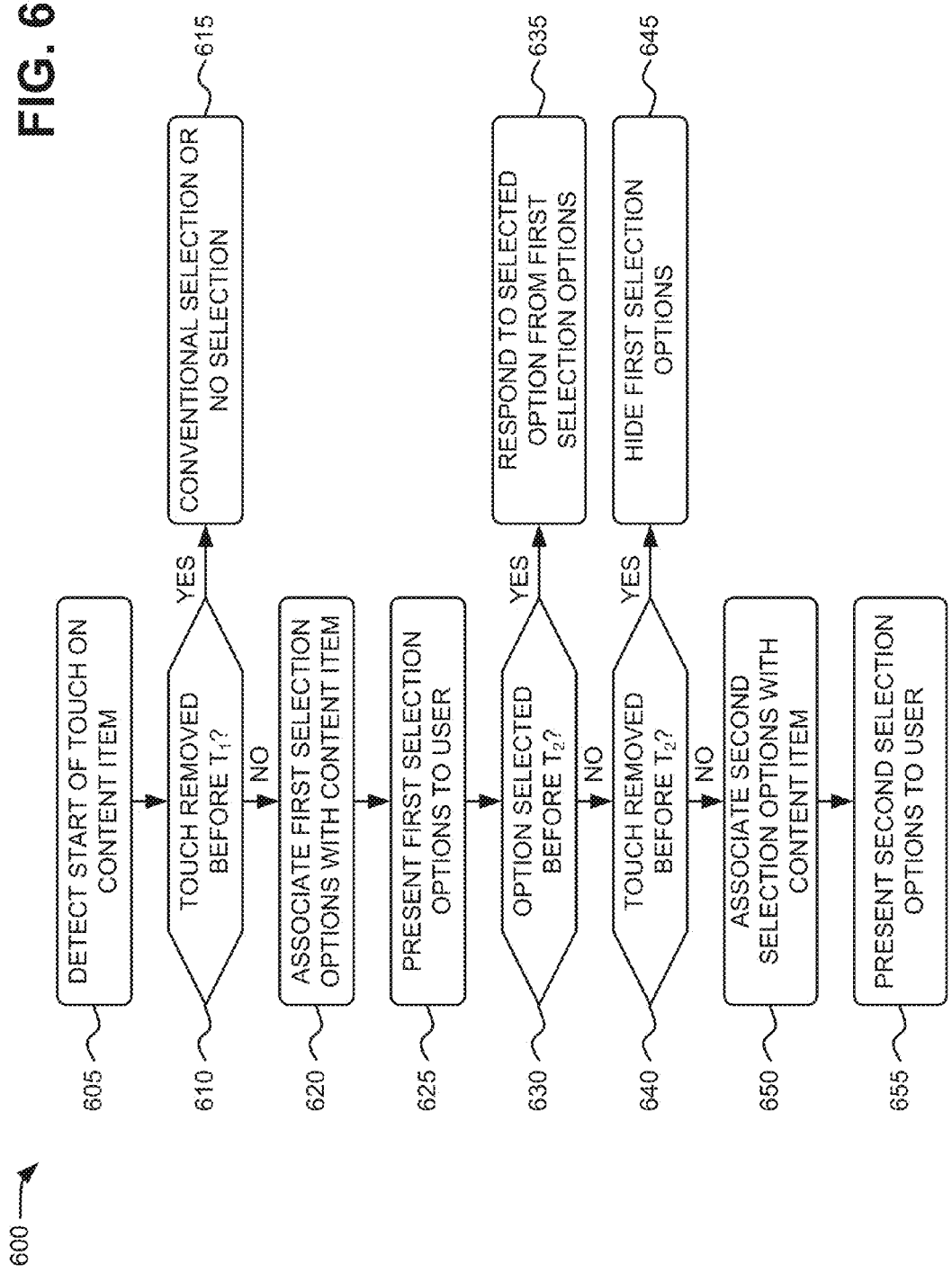

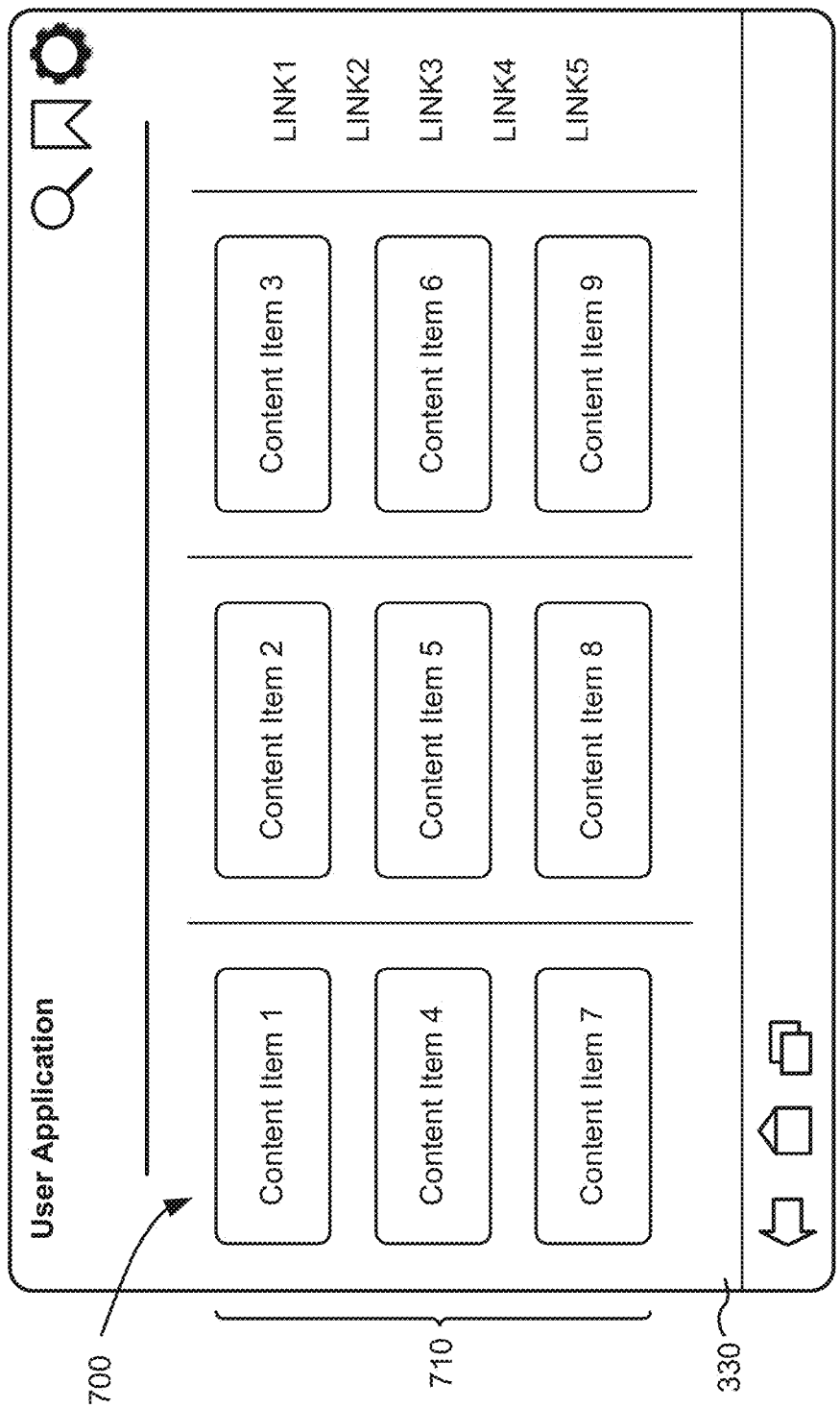

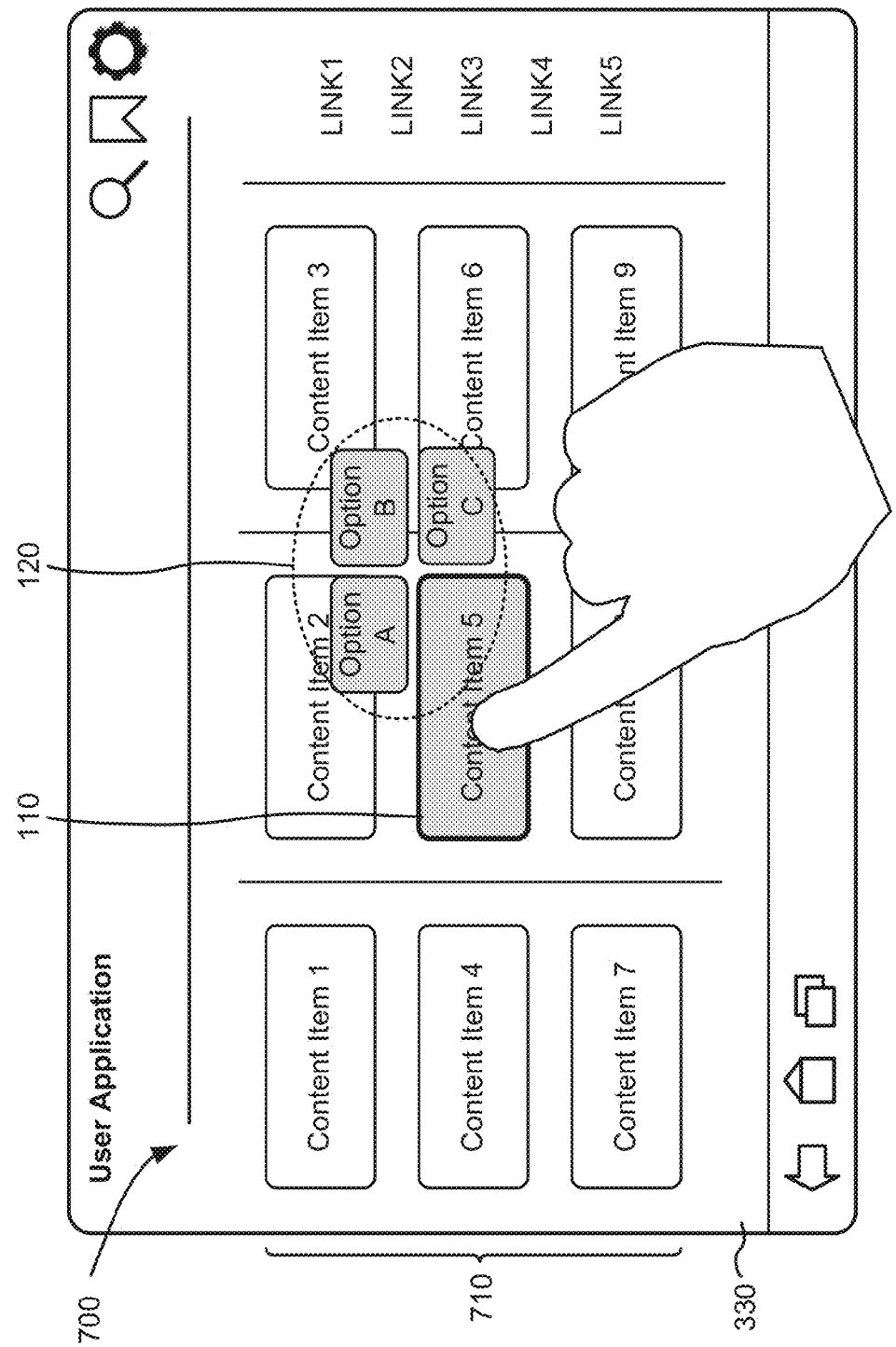

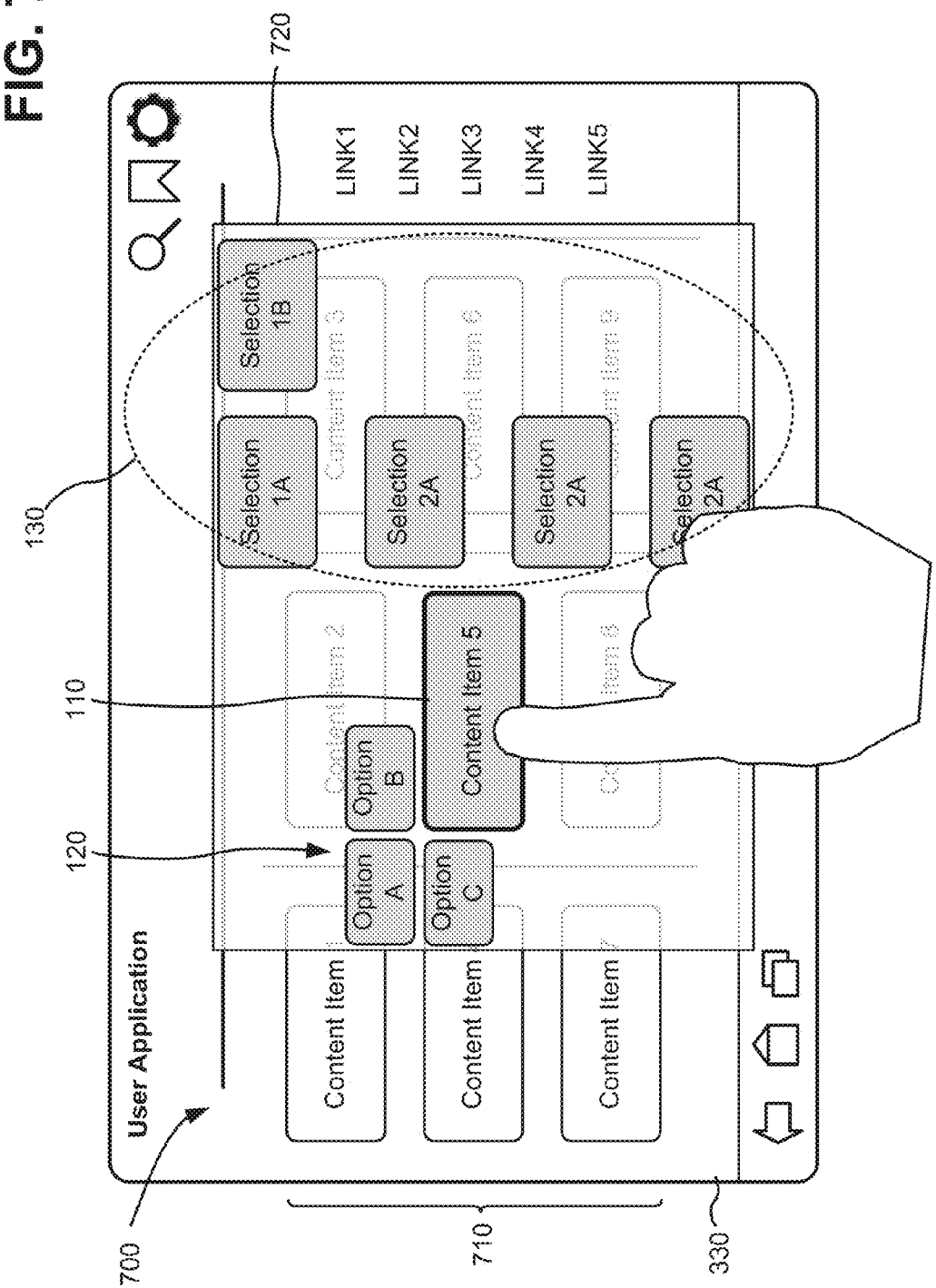

TIME-BASED TOUCH INTERFACE

BACKGROUND

Network based multimedia applications can provide access to an ever-growing amount and variety of content, services, and equipment, such as broadcast television content, non-broadcast television content (often referred to as "cable" television content), on demand and pay-per-view content, wireless services, widgets, applications, social media, etc. Content may be supplemented with an increasing variety of related information and user options. For example, a single video program may be associated with detailed information relating to actors, production information, previews, reviews, ratings, photographs, deleted scenes/bloopers, and/or series context. Additionally, users may have multiple options to act upon a content option, such as, bookmarking, sharing, viewing, scheduling, rating, or commenting on particular content.

Presenting information and user options relating to content in a simple, accessible manner is becoming increasingly difficult as the number and variety of options increases. Existing user interfaces may provide one of a variety of menu formats that group menu items into categories and sub-categories. These user interfaces may require a user to "drill down" through multiple menus to select a desired icon or other item.

BRIEF DESCRIPTION OF THE DRAWINGS

FIG. 2 is a diagram of an exemplary network environment in which systems and/or methods described herein may be implemented;

FIG. 6 is a flow diagram of an exemplary process for presenting a time-dependent touch-based user interface according to an implementation described herein; and FIGS. 7A-7F are diagrams of an exemplary user interface associated with the process of FIG. 6.

DETAILED DESCRIPTION OF PREFERRED EMBODIMENTS

The following detailed description refers to the accompanying drawings. The same reference numbers in different drawings may identify the same or similar elements.

Systems and methods described herein include a user interface for presenting multiple types of information and/or options associated with a particular content item. In one implementation, a user device may include a touch-sensitive display to present, to a user, a user interface with multiple content options. The user device may detect a touch indicating selection of one of the multiple content options and may determine if the duration of the touch exceeds a first time threshold. The user device may present a first set of selectable options, associated with the selected content option, when the duration of the touch exceeds the first time threshold. A user may continue to hold the touch, and the user may determine if the duration of the touch exceeds a second (e.g., longer) time threshold. The user device may then present a second set of selectable options, associated with the selected content option, when the duration of the touch exceeds the second time threshold. In one implementation, the first and/or second set of selectable options may include data-driven icons with a consolidated view of information available by selecting each particular icon.

In one implementation, the systems and methods described herein may provide a platform to conveniently select and present information related to video content. In other implementations, the systems and methods may relate to audio (e.g., music, books, podcasts, etc.) content. In still other implementations, the systems and methods may relate to other forms of data presentation, such as inventory systems, network information systems, medical technology, research tools, etc. Thus, systems and/or methods described herein may provide a user interface to present content options and information relating to content in a simple, flat (or single level) format, without the need to drill down through multiple menu items.

Figure 1A:
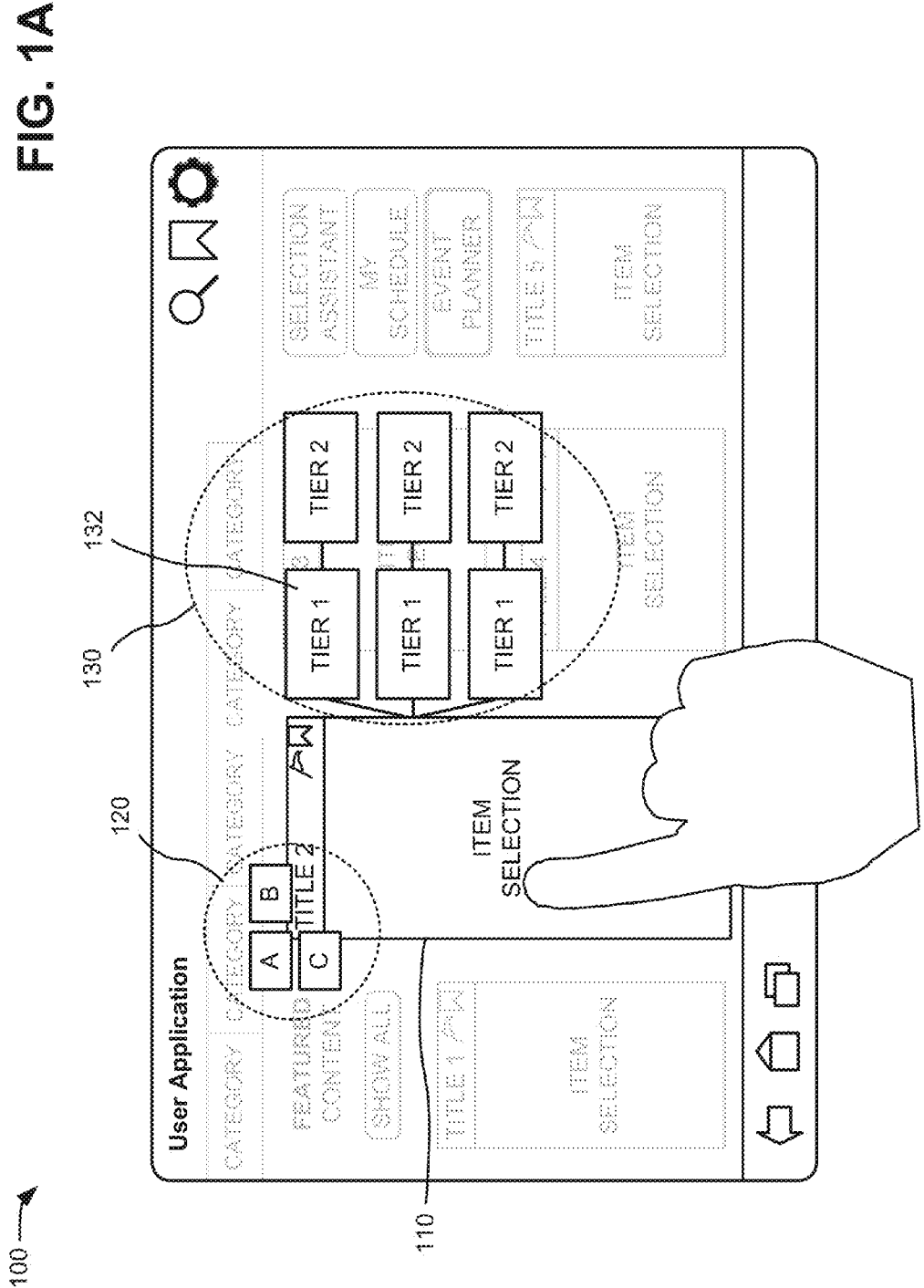
FIGS. 1A and B are diagrams illustrating an exemplary implementation of concepts described herein.

FIG. 1A is a diagram illustrating an exemplary implementation of concepts described herein. As shown in FIG. 1A, a graphical user interface 100, executed on a user device, may provide options to select from different content items (e.g., "Title 1", "Title 2," etc.). Graphical user interface 100 may allow a user to touch and hold an item 110 presented on a screen of the user device. A user may hold the touch on selected item 110 for an initial time period (e.g., one second). Holding the touch for an initial time period may cause the application to present a first set of options 120 relevant to the selected item. First set of options 120 may, for example, be overlaid on top of other (selected) content in user interface 100. The first set of options may include, for example, a set of popular commands associated with the type of selected item 110.

Holding the touch for a secondary period beyond the initial time period (e.g., holding for a total of two seconds) may cause the application to present a second set of options 130 relevant to the selected item. The second set of options 130 may, for example, be overlaid on top of other (unselected) content in user interface 100. For example, presentation of unselected options may be darkened (or lightened) as the second set of options 130 is overlaid on top. In one implementation, as shown in FIG. 1A, the second set of options 130 may be presented in a way that does not preclude a user's selection or viewing of the first set of options 120. Additionally, or alternatively, presentation of the second set of options 130 may include a repositioning and/or reformatting of the first set of options 120. In another implementation, first set of options 120 may be replaced by second set of options 130. In still another implementation, first set of options 120 may fade over a period of time after the second set of options 130 is presented.

In one implementation, each item in the second set of options 130 may be presented in a manner that identifies a degree of separation from selected item 110. For example, some items (e.g., "TIER 1" items) in the second set of options 130 may be presented in a closest positional association with the selected item 110. In one implementation, these "TIER 1" items may appear to be drawn or connected to the selected item from other areas on the display, like metal drawn to a magnet. Other items (e.g., "TIER 2" items) in the second set of options 130 may be presented in a more distant association with the selected item 110. For example, the "TIER 2" items may be drawn to a corresponding "TIER 1" item in a manner similar to the way the "TIER 1" items were drawn to selected item 110. Additional tiers of options e.g., a third tier, fourth tier, etc.) may be presented in a similar manner.

in another implementation, the number of displayed tiers may be associated with different touch durations. For example, "TIER 1" items may be presented after a particular touch duration (e.g., $T_2$), "TIER 2" items may be presented after a longer touch duration (e.g., $T_3$), and additional items may be presented after a still longer touch duration (e.g., $T_4$). Additionally, the size and/or brightness of each tier may vary during presentation. For example, as the duration of the touch grows, the "older" tiers may become dimmer and/or smaller as new tiers are added to the second set of options 130.

In another implementation, each row in the second set of options 130 may represent a category of information relevant to selected item 110. For example, assume selected item 110 represents a particular movie. A first row of options 130 may include links to leading cast members of the particular movie; a second row of options 130 may include links to trailers/previews of the particular movie; a third row of options 130 may include critics ratings; etc. In the implementation where rows of options 130 correspond to categories of information, each row may be presented in an order of relevance to the selected item 110. For example, a lead actor may be placed closest to selected item 110, with supporting actors placed further away in the same row.

Figure 1B:
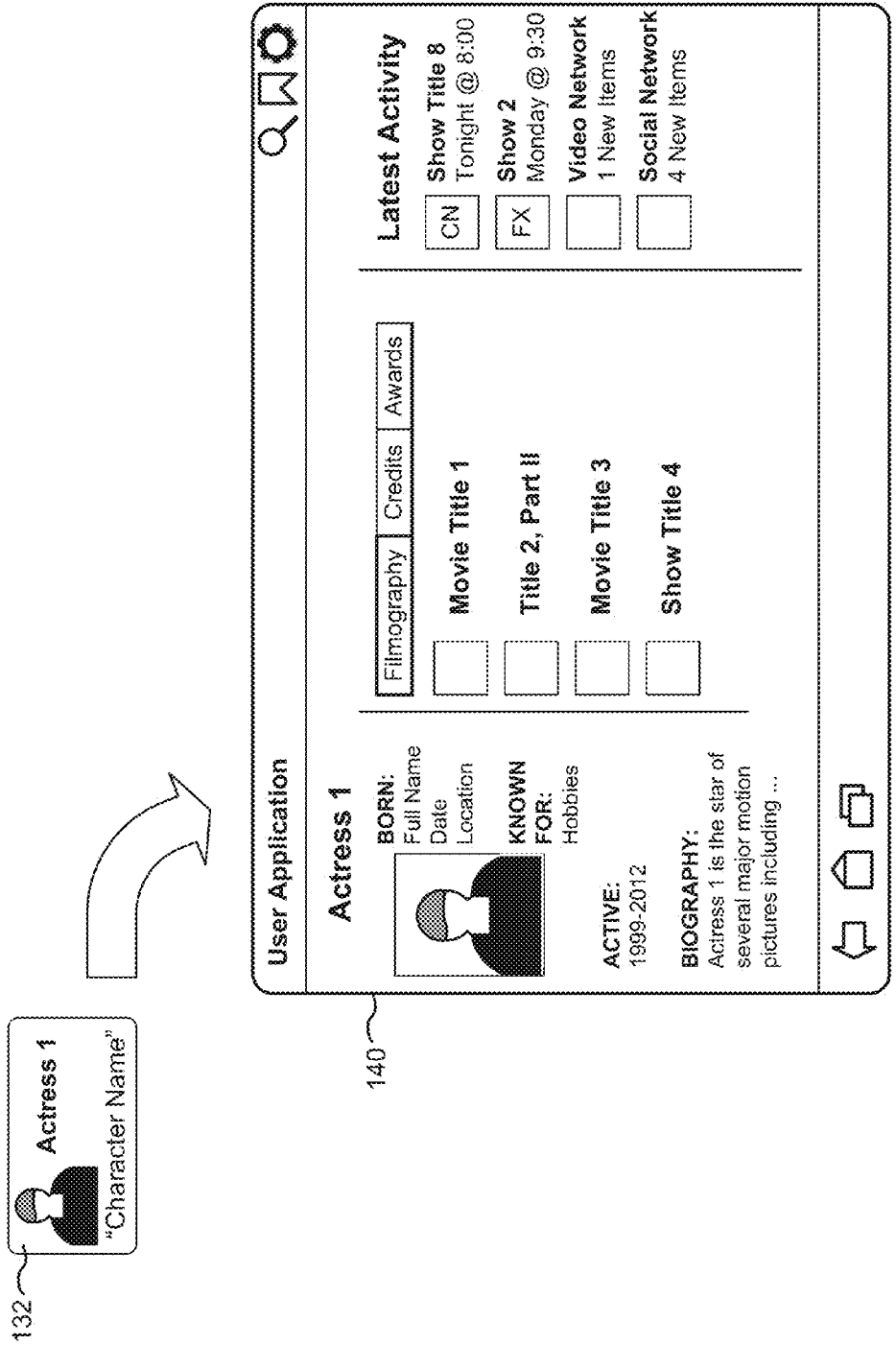

Options within the first set of options 120 and/or the second set of options 130 may be presented as data-driven icons, with each data-driven icon including a consolidated and/or excerpted version of information available by selecting the data-driven icon. FIG. 1B provides an example of a data-driven icon 132 that may be included, for example, as part of second set of options 130. As shown in FIG. 1B, data-driven icon 132 may include a subset of information, such as particular fields from a larger data set, used to generate a more detailed page. For example, as part of options 130 directed to a particular actress (e.g., "Actress 1" who is part of the cast of a movie represented by selected item 110), data-driven icon 132 may include a picture of the actress, the actress' name, and the character name of the actress used in the movie. Selection (by a user) of data-driven icon 132 may cause a full detailed page 140 (e.g., with details relating to "Actress 1") to be presented in place of or overlaid on user interface 100.

Another example of data-driven icon 132 may include content reviews that show, for example, a source (e.g., USA Today) and orating (e.g., 3 stars), and links to a full detailed page of that particular review. In another instance, data-driven icon 132 may include a concise description of content plot with a link to a more detailed plot summary. In still another instance, data-driven icon 132 may include supply chain information, such as lead times, vendor information, customization options, etc., that may link to more detailed information.

FIG. 2 is an exemplary network environment 200 in which systems and/or methods described herein may be implemented. As illustrated, network environment 200 may include a user device 210 and a data center 220 interconnected by a network 230. Components of network environment 200 may be connected via wired and/or wireless links.

User device 210 may include a computational or communication device. User device 210 may enable a user to present content listings, view content, and/or interact with other devices (e.g., in data center 220). For example, user device 210 may include a tablet computer, a personal computer, a smart phone, a personal gaming system, a global positioning system (GPS) unit, a touch-enabled television display, or other types of computation or communication devices that implement a touch or near-touch interface.

Data center 220 may include one or more network devices associated with a service provider. or content provider. Data center 220 may collect and/or provide listings of content available to particular user devices 210. For example, data center 220 may use content metadata to provide currently-available content options to user devices 210 (e.g., based on, for example, particular accounts and/or authentications associated with user device 210). In another implementation, data center 220 may provide content metadata directly to user device 210. Content metadata may generally include information about any type of particular content, such as video, web pages, images, books, articles, etc. In the context of multimedia content, content metadata may include, for example, titles, descriptions, images, talent, genres, times, durations, access information, etc., associated with particular multimedia content.

In implementations described herein, data center 220 may perform backend services to support features of user interface 100 operating on user device 210. For example, data center 220 may perform searches based on input received from user device 210 and provide search results to user device 210. In one implementation, data center 220 may include a recommendation engine to store/access user profile data to provide content recommendations for options user device 210 presents in user interface 100 (e.g., options for first set of options 120 and/or second set of options 130). Interactions between data center 220 and user device 210 may be performed, for example, using hypertext transfer protocol (HTTP) Or secure HTTP (HTTPS) via network 230.

Network 230 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element in FIG. 2, network 230 may include a number of separate networks that function to provide services to user device 210.

In FIG. 2, the particular arrangement and number of components of network environment 200 are illustrated for simplicity. In practice, network environment 200 may include more user devices 210, data centers 220, or networks 230.

Figure 3:
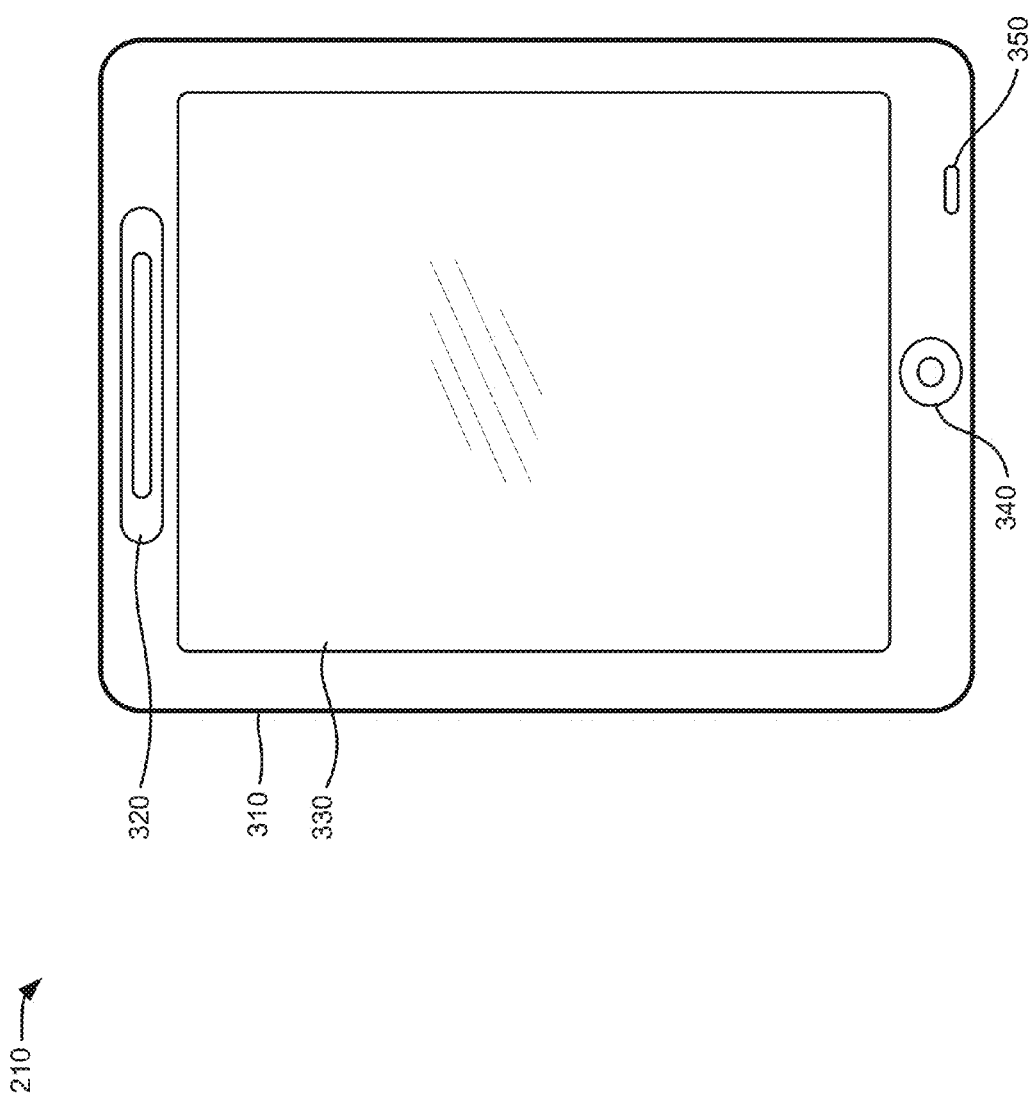
FIG. 3 is a diagram of an exemplary device in which systems and/or methods described herein may be implemented.

FIG. 3 is a diagram of an exemplary user device 210. As illustrated in FIG. 3, user device 210 may include a housing 310, a speaker 320, a display 330, control button 340, and/or a microphone 350. Housing 310 may protect the components of user device 210 from outside elements. For example, housing 310 may be formed from plastic, metal, or a composite, and may be configured to support speaker 320, display 330, control button 340, and/or microphone 350.

Speaker 320 may provide audible information to a user of user device 210. Speaker 320 may be located in an upper portion of user device 210, and may function as an ear piece when a user is engaged in a communication session using user device 210. Speaker 320 may also function as an output device for audio information associated with games and/or video images played on user device 210.

Display 330 may provide visual information to the user. For example, display 330 may display text, images, video, and/or graphics received from another device, and/or relating to applications executed on user device 210. Display 330 may include a liquid crystal display (LCD), such as a thin film transistor (TFT) LCD, plasma display, etc.

In one implementation, display 330 may include a touch screen that may be configured to receive a user input when the user touches (or comes in close proximity to) display 330. For example, the user may provide an input to display 330 directly, such as via the user's finger, or via other devices, such as a stylus. User inputs received via display 330 may be processed by components and/or devices operating in user device 210. The touch-sensitive display 330 may permit the user to interact with user device 210 in order to cause user device 210 to perform one or more operations. Exemplary technologies to implement a touch screen on display 330 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 330 to be used as an input device. The touch-sensitive display 330 may also identify a duration of a touch and/or movement of a body part or a pointing device as it moves on or near the surface of the touch-sensitive display 330.

Control button 340 may permit the user to interact with user device 210 to cause user device 210 to perform one or more operations. For example, control button 340 may be used to cause user device 210 to close an application, transmit information, or to cancel a command.

Microphone 350 may receive audible information from the user. For example, microphone 350 may receive audio signals from the user and may output electrical signals corresponding to the received audio signals.

Although FIG. 3 shows exemplary components of user device 210, in other implementations, user, device 210 may contain fewer, different, differently-arranged, or additional components than depicted in FIG. 3. For example, in one implementation, user device 210 may also include an integrated or detachable keyboard. In still other implementations, a component of user device 210 may perform one or more tasks described as being performed by another component of user device 210.

Figure 4:
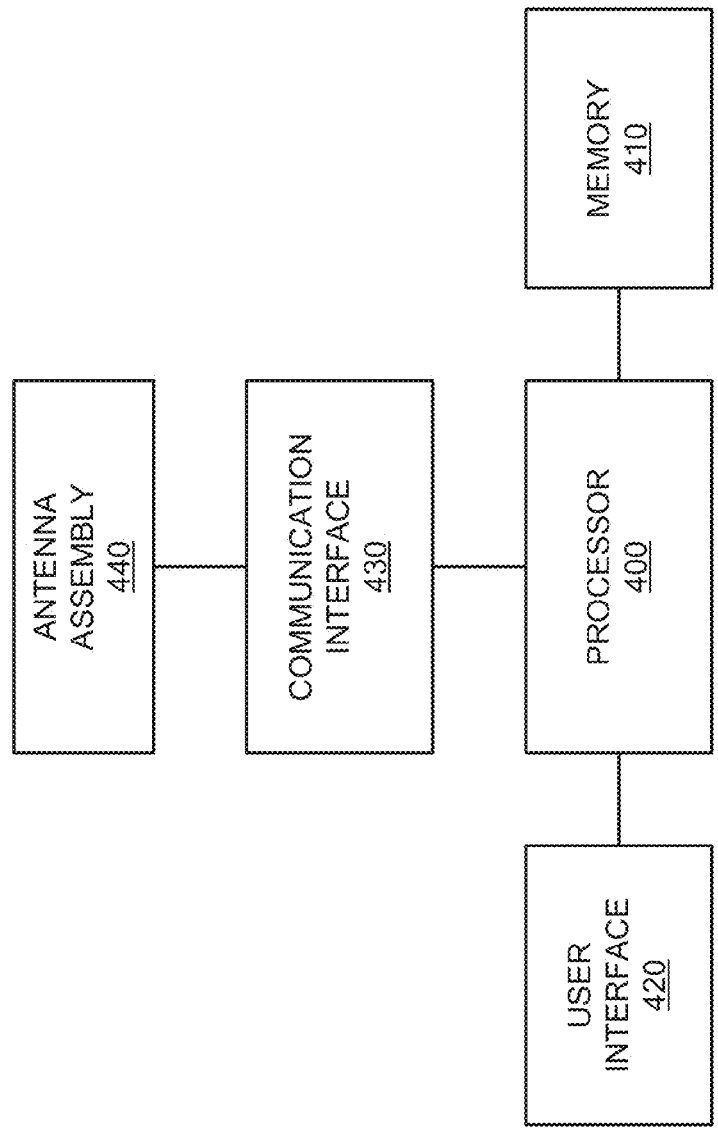
FIG. 4 is a block diagram of exemplary components of the user device illustrated in FIG. 3.

FIG. 4 is a diagram of exemplary components of user device 210. As illustrated, user device 210 may include a processor 400, a memory 410, a user interface 420, a communication interface 430, and/or an antenna assembly 440. User device 210 may include other components (not shown) that aid in receiving, transmitting, and/or processing data. Moreover, other configurations of components in user device 210 are possible.

Processor 400 may include one or more processors, microprocessors, application specific integrated circuits (ASICs), field programmable gate arrays (FPGAs), or the like. Processor 400 may control operation of user device 210 and its components. In one implementation, processor 400 may control operation of components of user device 210 in a manner described herein.

Memory 410 may include a random access memory (RAM) or another type of dynamic storage device that may store information and instructions, e.g., an application, for execution by processor 400; a read-only memory (ROM) device or another type of static storage device that may store static information and instructions for use by processor 400; and/or some other type of magnetic or optical recording medium and its corresponding drive, e.g., a hard disk drive (HDD), for storing information and/or instructions. In one implementation, memory 410 may store instructions and/or data used to display a graphical user interface, such as graphical user interface 100 on display 430.

User interface 420 may include mechanisms for inputting information to user device 210 and/or for outputting information from user device 210. Examples of input and output mechanisms might include buttons (e.g., control button 340, keys of a keypad, a joystick, etc.); a speaker (e.g., speaker 320) to receive electrical signals and output audio signals; a microphone (e.g., microphone 350) to receive audio signals and output electrical signals; a display (e.g., display 330) to receive touch input and/or to output visual information; a vibrator to cause user device 210 to vibrate; and/or a camera to receive video and/or images.

Communication interface 430 may include, for example, a transmitter that may convert baseband signals from processor 400 to radio frequency (RF) signals and/or a receiver that my convert RF signals to baseband signals. Alternatively, communication interface 430 may include transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As will be described in detail below, user device 210 may perform certain operations in response to processor 400 executing software instructions contained in a computer-readable medium, such as memory 410. A computer-readable medium may include a non-transitory memory device. A memory device may include space within a single physical memory device or spread across multiple physical memory devices. The software instructions may be read into memory 410 from another computer-readable medium or from another device via communication interface 430. The software instructions contained in memory 410 may cause processor 400 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 210, in other implementations, user device 210 may contain fewer, different, differently-arranged, or additional components than depicted in FIG. 4. In still other implementations, a component of user device 210 may perform one or more other tasks described as being performed by another component of user device 210.

Figure 5:
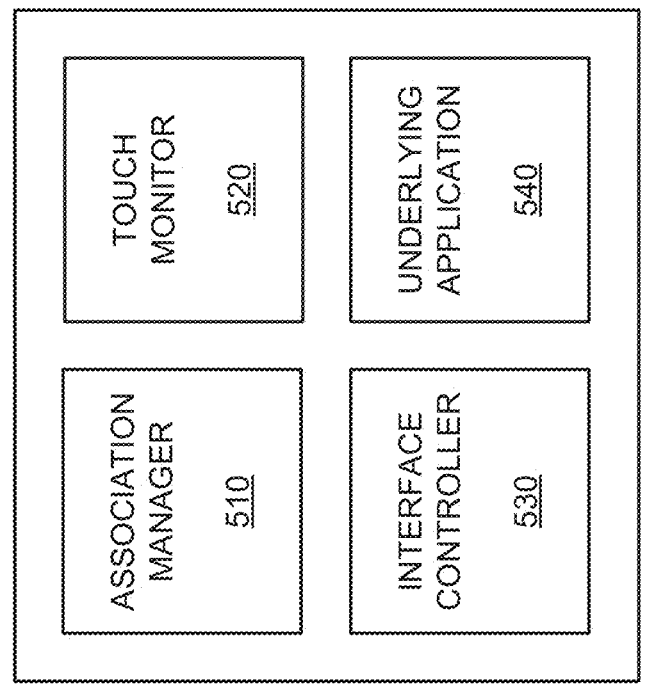
FIG. 5 is a block diagram of exemplary functional components of the user device illustrated in FIG. 3.

FIG. 5 provides a diagram of exemplary functional components of user device 210. The functional components may be implemented by, for example, processor 400 in conjunction with memory 410. As shown in FIG. 5, user device 210 may include an association manager 510, a touch monitor 520, an interface controller 530, and an underlying application 540. User device 210 may also include other peripheral applications (not shown) associated with options that may be presented to users of user interface 100. Peripheral applications may include, for example, a file manager application, an email application, an instant messaging (IM) application, a calendar application, a multimedia messaging service (MMS) application, a short message service (SMS) application, an image viewing application, a camera application, a video player, an audio application, a global positioning system (GPS) application, etc.

Association manager 510 may identify options to associate with a selected item from graphical user interface 100, such as selected item 110. For example, association manager 510 may associate options for the first set of options 120 and/or the second set of options 130. In one implementation, the first set of options 120 may include a standard set of options for a particular type of selected item. The second set of options 130 may include options that may relate to a particular title and that may be different depending on the title selected from graphical user interface 100, such as options for related content associated with a selected title. In one implementation, association manager 510 may employ one or more other local applications or networked applications (e.g., in data center 220) to identify material for the second set of options.

As an example, assume that graphical user interface 100 provides selections of video content that be consumed by a user. Association manager 510 may include, in the first set of options, shortcuts (or links) related to each particular title available for selection, such as an "add to bookmarks" option (e.g., to save a link to selected item 110 in user's profile), a "watch trailer" option (e.g., to view promotional clips), and a "share" option (e.g., to share a link to the video content associated with selected item 110). The first set of options 120 may be configured so that a user may select an option from the first set of options 120 to perform a particular task for the selected item 110. Association manager 510 may include, in the second set of options, shortcuts (or links) related to the actual content of the selected item 110, such as cast information, critic ratings, friend ratings, sharing recommendations, alternate content suggestions, etc. Cast information may include, for example, data/images about primary actors in the content associated with selected item 110. Critic information may include published ratings and reviews of the content associated with selected item 110. Friend ratings may include ratings by particular users of a provider network or social network (e.g., friends associated with a current user of user interface 100). Sharing recommendations may include particular friends of the user with whom to share a link to the video content associated with selected item 110 (e.g., based on user profiles, presence status, etc.). Alternate content suggestions may include, for example, content with similar features to selected item 110 or features matching a user's profile.

At least some of the options in the second set of options 130 may be generated based on communications with other devices and/or remote systems (e.g., data center 220) to identify matches based on content metadata. User device 210 may communicate with, for example, a recommendation engine or profile matching system (e.g., in data center 220) to generate options for the second set of options 130. In still another implementation, association manager 510 or a remote system may employ communication mapping logic to generate options for the second set of options using information extracted from, for example, social media, key words, and/or metadata associated with selected item 110. One example of such logic includes conversation mapping concepts provided in U.S. patent application Ser. No. 12/335,033, filed Dec. 15, 2008, which is incorporated herein by reference.

In one implementation, association manager 510 may extract selected data from a larger data set that may be deemed relevant to selected item 110. For example, if a particular person (e.g., actor, performer, author, director, etc.) is associated with selected item 110, association manager 510 may extract data from particular fields of a larger data set for the particular person. The extracted data may be used, for example, to display in a data-driven icon 132 that would also provide a link to a detailed page (e.g., full detailed page 140) for the person.

Touch monitor 520 may identify timing and movement of touches on graphical user interface 100. For example, touch monitor 520 may detect a touch on one of selected items 110 and initiate a clock sequence to determine the duration of the touch on the selected item 110. When touch monitor 520 detects that a touch duration reaches a first timing threshold, touch monitor 520 may generate a signal (e.g., to interface controller 530) to present first set of options 120. When touch monitor 520 detects that a touch duration reaches a second timing threshold, touch monitor 520 may generate another signal (e.g., to interface controller 530) to present second set of options 130.

Interface controller 530 may generate presentation of display icons for first set of options 120 and second set of options 130. Interface controller 530 may generate the options based on, for example, information retrieved from association manager 510. For example, interface controller 530 may receive a signal from touch monitor 520 to present first set of options 120 or second set of options 130. In response to the signal from touch monitor 520, interface controller 530 may retrieve, from association manager 510, data to support generation of data-driven icons for the selected option 110. Interface controller 530 may generate the data-driven icons and may present the data-driven icons as first set of options 120 and/or second set of options 130 on graphical user interface 100.

Underlying application 540 may include one or more applications from which selected options (e.g., selected option 110) may be generated. In one implementation, for example, underlying application 540 may include a video application play content from a service provider network. The video application may enable user device 210 to perform functions, such as: playing video content, communicating with and/or presenting information received from data center 220 to a user, permitting a user of user device 210 to login to an account with a service provider network associated with data center 220); permitting a user of user device 210 to login to an account with a video content provider and/or web content provider; accessing catalog information (e.g., from data center 220); submitting a video order; and/or consuming live streaming video content (e.g., from a content provider).

Although FIG. 5 shows exemplary functional components of user device 210, in other implementations, user device 210 may contain fewer, different, differently-arranged, or additional functional components than depicted in FIG. 5. In still other implementations, a functional component of user device 210 may perform one or more tasks described as being performed by another functional component of user device 210.

FIG. 6 is a flow diagram of an exemplary process 600 for presenting a time-dependent touch-based user interface. In one implementation, process 600 may be performed by user device 210. In another implementation, some or all of process 600 may be performed by another device or group of devices, including or excluding user device 210. For example, a device in data center 220 may perform one or more parts of process 600.

Process blocks in process 600 are described below in the context of graphical user interface 700 of FIGS. 7A-7E. For example, FIG. 7A includes user interface 700 with presentation of multiple content items 710 on touch-sensitive display 330. Each of multiple content items 710 may be configured to present multiple options to a user based on a time-dependent touch-based selection.

Figure 7B:
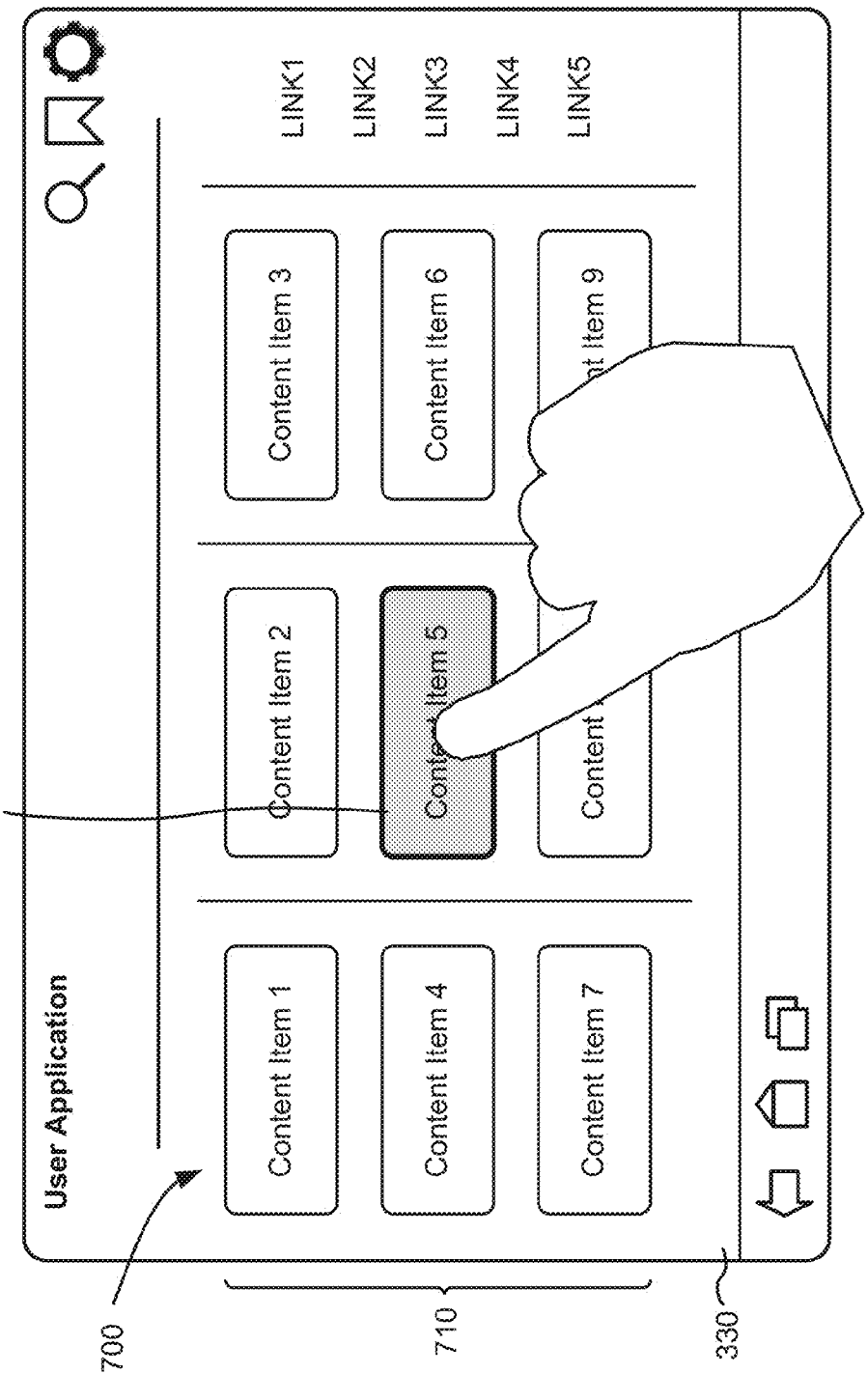

As shown in FIG. 6, process 600 may include detecting a start of a touch on a content item (block 605) and determining if the touch is removed before reaching a time threshold, $T_1$ (block 610). For example, as shown in FIG. 7B, a user may touch an icon for a desired content item 710 (e.g., "content item 5") and hold the touch on the desired content item for a period of time. User device 210 (e.g., touch monitor 520) may detect the touch on content item 5 and initiate clock sequences or a timer to calculate the duration of the touch in relation to an initial time threshold, $T_1$, which may be approximately one second.

If the touch is removed before $T_1$ (block 610—YES), a conventional selection or no selection may be indicated (block 615). For example, still referring to FIG. 7B, if the user removes his finger from content item 5 in less than one second, the time-dependent features of user interface 700 may not be invoked. Thus, user device 210 may respond to the user's touch as a conventional selection (e.g., to launch an application to view the selected content item) or take no action.

If the touch is not removed before $T_1$, (block 610—NO), a first set of selection options may be associated with the content item (block 620) and the first selection options may be presented to a user (block 625). For example, referring to FIG. 7C, if the user holds his touch on contact item 5 for one second, user device 210 may identify and present a set first selection options. More particularly, interface controller 530 may retrieve, from association manager 510, a set of selection options associated with the type of content represented by content item 5. In one implementation, interface controller 530 may present the set of selection options to the user as first selection option set 120 that includes icons wrapping-around a corner of the selected content item (e.g., content item 5). In one implementation, icons in first selection option set 120 may include animations, simulated motions, vibrations, etc., to set them apart from other information on graphical user interface 700.

Figure 7D:
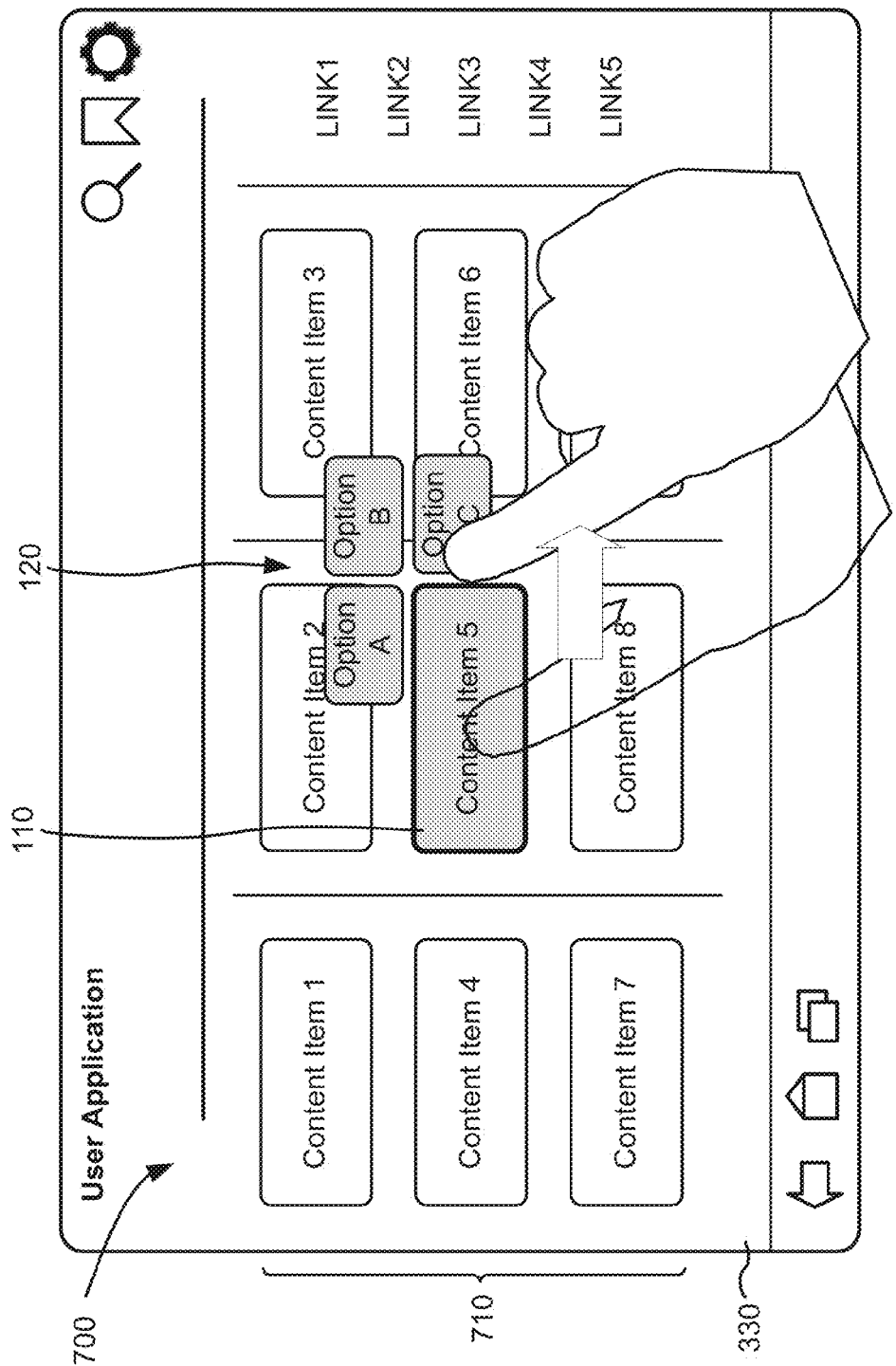

Process 600 may also include determining if one of the first set of selection options is selected before another time threshold $T_2$ (block 630). For example, as shown in FIG. 7D, the user may select one e.g., "Option C") of the icons in first selection option set 120 by sliding the user's finger from the original touch position to the selected icon (e.g., while maintaining touch contact with display 330).

If one of the first set of selection options is selected before another time threshold $T_2$ (block 630—YES), then process 600 may include responding to the selected option from the first set of selection options (block 635). For example, still referring to FIG. 7D, if user device 210 (e.g., touch monitor 520) detects a user's selection one of the icons in first selection option set 120 during the interval between $T_1$ (about one second) and $T_2$ (two or more seconds), user device 210 (e.g., interface controller 530) may initiate a command to perform an action associated with the selected icon (e.g., "Option C").

If one of the first set of selection options is no selected before $T_2$ (block 630—NO), then it may be determined if the touch is removed before $T_2$ (block 640). For example, referring again to FIG. 7B, the user may simply remove the finger from Content Item 5. User device 210 (e.g., touch monitor 520) may determine whether the initial touch duration exceeded the $T_2$ two second) threshold.

If the touch is removed before $T_2$ (block 640—YES), then the first selection options may be removed from presentation (block 645). For example, referring to FIGS. 7A and 7B, if touch monitor 520 detects that the touch duration does not exceed the two-second threshold, then touch monitor 520 may signal to interface controller 530 to simply remove the display of the icons in first selection option set 120 from user interface 700, returning user interface 700 to its original arrangement of FIG. 7A.

if the touch is not removed before $T_2$ (block 640—NO), then second selection options may be associated with the content item (block 650) and the second selection options may be presented to the user (block 655). For example, referring to FIG. 7E, if the user holds his touch on contact item 5 for more than two seconds, user device 210 may identify and present a set of second selection options. More particularly, interface controller 530 may retrieve, from association manager 510, a set of selection options associated with the actual content represented by content item 5. In one implementation, interface controller 530 may present the set of selection options to the user as second selection option set 130. Selection options 130 may include, for example, data-driven icons with consolidated information of more detailed pages that a user can access by selecting one of the selection options. As shown in FIG. 7E, icons in first selection option set 120 may be repositioned to permit display of second selection option set 130 in a left-to-right orientation. In one implementation, icons in first selection option set 120 may appear from different areas of user interface 700 and drawn to the selected content item (e.g., content item 5), simulating the effect of metal being drawn to a magnet.

In one implementation, the configuration of user interface 700 in FIG. 7E may remain displayed after a user removes the touch (e.g., at some time after the $T_2$ threshold). Options related to selected item 110 may be included within an overlay sec on 720 to indicate available options. A user may, for example, select an icon in first selection option set 120 or second selection option set 130 by initiating a new touch. Alternatively, a user may cancel the presentation of first selection option set 120 and second selection option set 130 by touching an area outside overlay section 720.

Figure 7F:
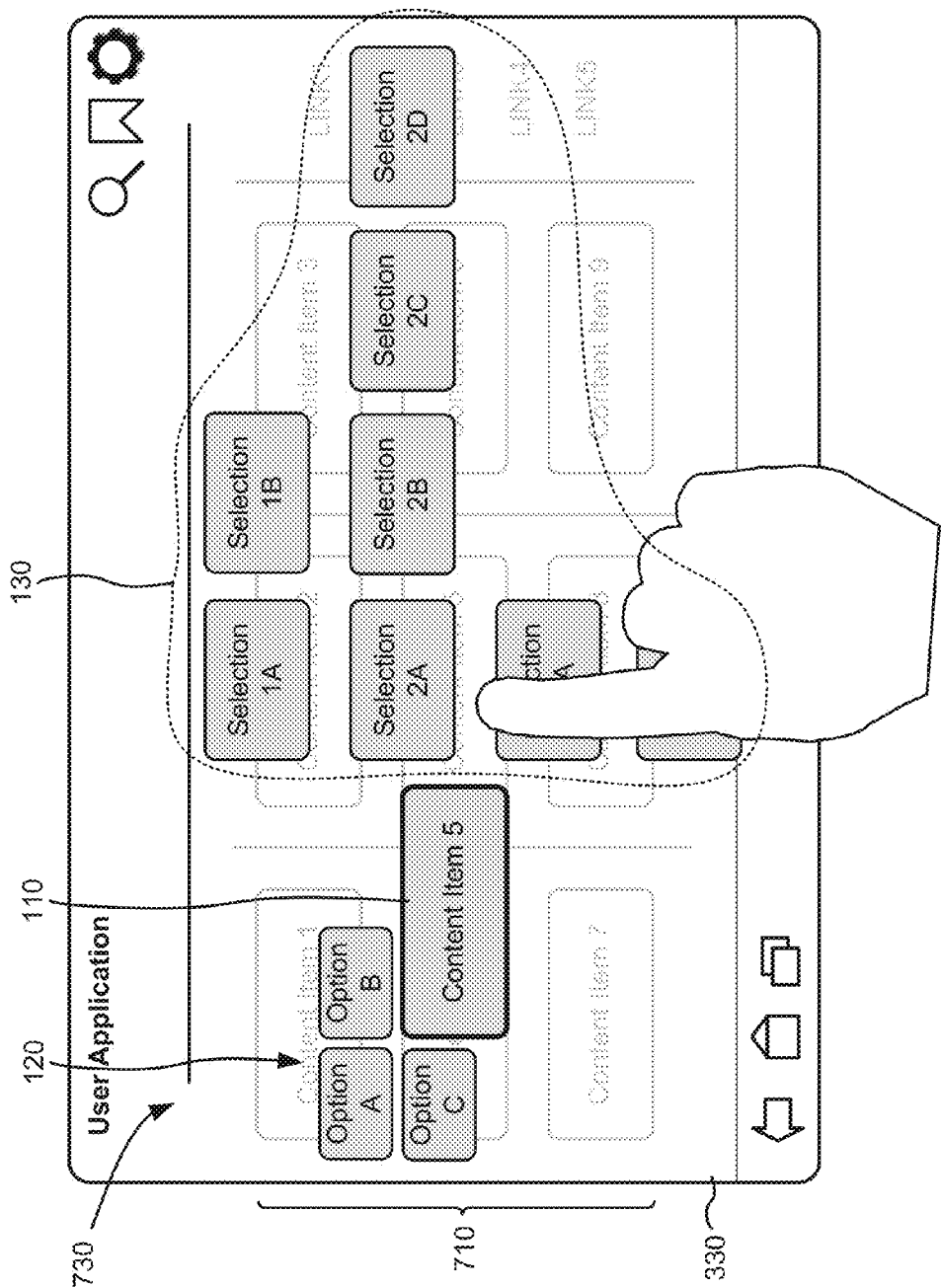

FIG. 7F provides an alternate arrangement for presenting first selection option set 120 and second selection option set 130 (e.g., when a touch is held past the $T_2$ threshold). Similar to FIG. 7E, user interface 730 of FIG. 7F chides selected item 110, first selection option set 120, and second selection option set 130. In contrast with FIG. 7E, after a touch is held past the $T_2$ threshold, user interface 730 may reposition selected item 110 to provide more space for second selection option set 130 in a left-to-right orientation. A user may, for example, select an icon in first selection option set 120 or second selection option set 130 by initiating a new touch. Alternatively, a user may cancel the presentation of first selection option set 120 and second selection option set 130 by touch background area outside of first selection option set 120 or second selection option set 130.

In implementations described herein a user device with a touch-sensitive display may present a user interface with multiple content options and detects, on the touch-sensitive display, a touch indicating selection of one of the multiple content options. The user device may monitor a duration of the touch. The user device may present a first set of selectable options, associated with the one of the multiple content options, when the duration of the touch exceeds the first time threshold, and may present a second set of selectable options, associated with the one of the multiple cont en options, when the duration of the touch exceeds the second time threshold.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 6, the order of the blocks may be modified in other implementations. Further, non-dependent blocks may be performed in parallel.

It will be apparent that different aspects of the description provide(above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   presenting, by the user device and to a user, a user interface providing multiple content options;
   detecting, by the user device and on the user interface, a touch indicating selection of one of the multiple content options;
   determining, by the user device, whether a duration of the touch exceeds a first time threshold;
   presenting, by the user device, a first set of selectable options, associated with the one of the multiple content options, in response to determining that the duration of the touch exceeds the first time threshold;
   determining, by the user device, whether the duration of the touch exceeds a second time threshold; and
   presenting, by the user device, a second set of selectable options, associated with the one of the multiple content options, in response to determining that the duration of the touch exceeds the second time threshold, wherein presenting the second set of selectable options includes:
      identifying, based on content metadata for content identified in the one of the multiple content options, a data set relevant to the one of the multiple content options,
      extracting, form the data set, particular fields for display in data-driven icons, and
      presenting the data-driven icons that display consolidated or excerpted versions of information that the user can access by selecting one of the second set of selectable options.

2. The method of claim 1, wherein the second set of selectable options includes a set of first tier options associated with the content of the one of the multiple content options and a set of second tier options associated with one or more of the first tier options.

3. The method of claim 2, wherein the first tier options are graphically presented as being drawn to the selected one of the multiple content from other areas on the user interface.

4. The method of claim 2, wherein the second tier options are graphically presented as being drawn to one or more of the first tier options.

5. The method of claim 1, further comprising:
   altering the presentation of the first set of selectable options when presenting the second set of selectable options.

6. The method of claim 1, wherein the first set of selectable options overlays other content of the user interface.

7. The method of claim 1, wherein the first set of selectable options is graphically presented as wrapping around a portion of the one of the multiple content options.

8. The method of claim 1, wherein the one of the multiple content options includes video content options.

9. The method of claim 8, wherein the first set of selectable options includes one or more of:
   a bookmark option for the video content,
   a watch trailer option for the content associated with the video content, or
   a sharing option o share a link to the video content with another user.

10. The method of claim 8, wherein the second set of selectable options includes one or more of:
    cast information for the video content,
    critic review information of the video content,
    user review information of the video content,
    recommended users with whom to share the video content, or
    suggested alternate video content.

11. The method of claim 1, further comprising:
    requesting, from a remote network device, information for the second set of selectable options when the duration of the touch exceeds the second time threshold.

12. A user device, comprising:
    one or more memories to store instructions, a first time threshold, and a second time threshold;
    a touch-sensitive display; and
    one or more processors configured to execute instructions in the one or more memories to:
    present, on the touch-sensitive display, a user interface with multiple content options,
    detect, on the touch-sensitive display, a touch, from a user, indicating selection of one of the multiple content options,
    monitor a duration of the touch,
    present a first set of selectable options, associated with the one of the multiple content options, when the duration of the touch exceeds the first time threshold, and
    present a second set of selectable options, associated with the one of the multiple content options, when the duration of the touch exceeds the second time threshold, wherein presenting the second set of selectable options includes:
       identifying, based on content metadata for content identified in the one of the multiple content options, a data set relevant to the one of the multiple content options,
       extracting, from the data set, particular fields for display in data-driven icons, and
       presenting the data-driven icons that display consolidated or excerpted versions of information that the user can access by selecting one of the second set of selectable options.

13. The user device of claim 12, wherein the one or more processors are further configured to:
    present the second set of selectable options with a set of first tier options associated with the content of the one of the multiple content options and a set of second tier options associated with one or more of the first tier options.

14. The user device of claim 12, wherein the second set of selectable options includes one or more of:
    cast information for the one of the multiple content options,
    critic review information of the one of the multiple content options,
    user review information of the one of the multiple content options,
    recommended users with whom to share the one of the multiple content options, or
    suggested alternate video content for one of the multiple content options.

15. The user device of claim 12, wherein the one or more processors are further configured to:
present the second set of selectable options as being drawn to or connected to the selected one of the multiple content options from other areas on the user interface.

16. The user device of claim 12, further comprising:
a network interface to communicate with one or more remote systems,
wherein the one or more processor are further configured to request, from a remote network device, information for the second set of selectable options when the duration of the touch exceeds the second time threshold.

17. The user device of claim 12, wherein the one or more processors are further configured to:
alter the presentation of the first set of selectable options when presenting the second set of selectable options.

18. A non-transitory computer-readable medium comprising computer-executable instructions, the computer-readable medium comprising one or more instructions to:
present, to a user, a user interface providing multiple video content options;
detect, on the user interface, a touch indicating selection of one of the multiple video content options;
determine if a duration of the touch exceeds a first time threshold;
present a first set of selectable options, associated with the one of the multiple video content options, when the duration of the touch exceeds the first time threshold;
determine if the duration of the touch exceeds a second time threshold; and
present a second set of selectable options, associated with the one of the multiple video content options, when the duration of the touch exceeds the second time threshold, wherein presenting the second set of selectable options includes:
identifying, based on content metadata for content indentified in the one of the multiple video content options, a data relevant to the one of the multiple video content options,
extracting, from the data set, particular fields for display in data-driven icons, and
presenting the data-driven icons that display consolidated or excerpted versions of information that the user can access by selecting one of the second set of selectable options.

19. The computer-readable medium of claim 18, further comprising one or more instructions to:
request, from a remote network device, information for the second set of selectable options when the duration of the touch exceeds the second time threshold.

20. The computer-readable medium of claim 18, further comprising one or more instructions to:
present the second set of selectable options as being drawn to or connected to the selected one of the multiple content options from other areas on the user interface.

* * * * *